United States Patent
Sugaya (10) Patent No.: US 8,977,740 B2
(45) Date of Patent: Mar. 10, 2015

(54) PORTABLE TERMINAL RECEIVING REMOTE SUPPORT, REMOTE SUPPORT METHOD, PROGRAM, OPERATOR SYSTEM, OPERATOR SERVER, AND OPERATOR TERMINAL FOR REMOTE SUPPORT

(75) Inventor: Shunji Sugaya, Tokyo (JP)

(73) Assignee: OPTiM Corporation, Saga (JP)

( * ) Notice: Subject to any disclaimer, the term of this patent is extended or adjusted under 35 U.S.C. 154(b) by 154 days.

(21) Appl. No.: 13/385,846

(22) Filed: Mar. 9, 2012

(65) Prior Publication Data

US 2013/0103824 A1   Apr. 25, 2013

(30) Foreign Application Priority Data

Oct. 24, 2011  (JP) .................................. 2011-232914

(51) Int. Cl.
  G06F 15/173  (2006.01)
  H04L 12/24   (2006.01)
  H04L 12/26   (2006.01)
(52) U.S. Cl.
  CPC ........ H04L 41/0803 (2013.01); H04L 41/0866 (2013.01); H04L 41/145 (2013.01); H04L 43/0817 (2013.01); H04L 41/12 (2013.01); H04L 41/0213 (2013.01)
  USPC .............. 709/224; 709/227; 714/4.4; 714/25; 379/102.01
(58) Field of Classification Search
  None
  See application file for complete search history.

(56) References Cited

U.S. PATENT DOCUMENTS

| 7,602,733 | B2 | 10/2009 | Huang et al. |
|---|---|---|---|
| 8,301,625 | B2 | 10/2012 | Sugaya |
| 2006/0129669 | A1 | 6/2006 | Kojima |
| 2009/0323555 | A1 | 12/2009 | Lancaster et al. |
| 2010/0115532 | A1* | 5/2010 | Peterson ........................ 719/320 |
| 2010/0223372 | A1* | 9/2010 | Nichols et al. ................ 709/223 |
| 2010/0324855 | A1* | 12/2010 | Parker ........................... 702/119 |
| 2011/0103562 | A1* | 5/2011 | Tritt ......................... 379/102.03 |
| 2011/0258307 | A1* | 10/2011 | Konopka et al. .............. 709/223 |
| 2012/0290694 | A9* | 11/2012 | Marl et al. .................... 709/223 |
| 2012/0320789 | A1* | 12/2012 | Wu et al. ....................... 370/254 |

FOREIGN PATENT DOCUMENTS

| JP | 2003006062 A | 1/2003 |
|---|---|---|
| JP | 2010-97587 | 4/2010 |
| JP | 2011034315 A | 2/2011 |
| KR | 10-2004-0015802 | 2/2004 |
| KR | 10-2011-0014248 | 2/2011 |

* cited by examiner

Primary Examiner — Nicholas Taylor
Assistant Examiner — Clayton R Williams
(74) Attorney, Agent, or Firm — BainwoodHuang (57) ABSTRACT

When not the target device accessed by an operator terminal but other devices communicatably connected therewith have problems, the setting operation and the status viewing of the device with a problem are enabled through the target device accessed by an operator terminal. The portable terminal detects the electric appliance connected with a local area network connected with the portable terminal, in response to an instruction from the operator terminal. The portable terminal enables the setting operation and the status viewing of the electric appliance from the operator terminal based on the determined model related information, so that the problem of the electric appliance can be solved.

11 Claims, 9 Drawing Sheets

PORTABLE TERMINAL RECEIVING REMOTE SUPPORT, REMOTE SUPPORT METHOD, PROGRAM, OPERATOR SYSTEM, OPERATOR SERVER, AND OPERATOR TERMINAL FOR REMOTE SUPPORT

CROSS REFERENCE TO RELATED APPLICATIONS

This application is based on and claims the benefit of priority from Japanese Patent Application No. 2011-232914, filed on Oct. 24, 2011, the content and teaching of which are incorporated herein by reference.

TECHNICAL FIELD

The present disclosure relates to a portable terminal connected with an operator terminal through a public line network to receive remote support, a remote support method, a program, an operator system, an operator server, and an operator terminal for remote support.

BACKGROUND ART

In recent years, various services have been provided for users by connecting portable terminals with a web server and the like through a public line network. In particular, advanced services, which have been provided for personal computers conventionally, have become possible to provide for mobile phones by the appearance of smart phones (highly functional mobile phones).

In addition to services provided from servers, smart phones themselves have various functions. However, it often takes time for users to become familiar with all the functions. For example, even if a smart phone has functions as a user desires, the problem in which the user cannot utilize the functions has been presented because the user are not sure how to set up the functions.

In order to maximize the use of advanced web services and the high functionality of a smart phone, users need to know the setting operation and the functions of a smart phone. In addition, if a user who is not used to the setting operation of the user's terminal for the first time, setting information that should not be deleted may actually deleted, or inappropriate configuration may be set to cause an error.

For approaching such problems, there has been a known method of remotely supporting (maintaining) a user's terminal from a system to remotely configure the user's terminal and to remotely guide the user of the terminal. For example, PLT 1 discloses that a server side acquires the screen information of each client to be supported and constantly displays a list of this screen information on the server to promote the efficiency of supporting and monitoring a client.

In addition, it is known that remote operation is conducted, for example, by remotely logging into a user terminal that receives support, from a terminal that conducts remote support and then sharing a screen in real time. Specifically, a screen being displayed on a user terminal is sequentially forwarded to an operator to be displayed thereon, and the operator terminal is operated. This enables input (remote) operation as if the user terminal is operated. In addition, PLT 2 discloses the method of conducting remote support by using a mobile phone.

However, when remotely logging on a device, an operator who operates an operator terminal may find that not the device but the devices connected therewith may have problems. For example, viewing and operating the SSID configuration of the wireless router are required for setting an SSID (Service Set Identifier) when a smart phone receiving support is connected with a domestic wireless LAN. Accordingly, logging onto only a smart phone does not help much.

The inventor has paid attention whether or not using a device ("smart phone" is used herein) to be supported enables the devices communicatably connected therewith to be operated or viewed.

CITATION LIST

Patent Literature

PLT 1: Japanese Unexamined Patent Application 2003-6062

PLT 2: Japanese Unexamined Patent Application 2011-034315

SUMMARY OF INVENTION

One objective of the present disclosure is to provide a portable terminal, a remote support method, a program, an operator system, an operator server, and an operator terminal for remote support, in which when not a target device accessed by an operator terminal but other devices communicatably connected therewith have problems, using the target device accessed by an operator terminal enables the setting operation and the status viewing of the communicatably connected devices.

According to a first aspect of the present disclosure, a portable terminal receiving remote support from an operator terminal, the portable terminal communicatably connected with an electric appliance through a local area network and connected with the operator terminal through a public line network, includes:

an electric appliance detection module detecting an electric appliance connected with a local area network connected with the portable terminal, in response to an instruction from the operator terminal;

an electric appliance determination module determining the model related information of the detected electric appliance; and an operator assistance module enabling the setting operation or the status viewing of the electric appliance through the operator terminal based on the determined model related information.

According to the first aspect of the present disclosure, a portable terminal receiving remote support from an operator terminal, the portable terminal communicatably connected with an electric appliance through a local area network and connected with the operator terminal through a public line network detects an electric appliance connected with a local area network connected with the portable terminal, in response to an instruction from the operator terminal, and determines the model related information of the detected electric appliance. The portable terminal then enables the setting operation or the status viewing of the electric appliance through the operator terminal based on the determined model related information.

Accordingly, when not the target device accessed by an operator terminal but other devices communicatably connected therewith have problems, an operator can configure the setting and view the status of the device with a problem, using the target device accessed by an operator terminal.

The first aspect of the present disclosure is the category of portable terminal, but the categories of remote support method and program for remote support have similar functions and effects.

According to the second aspect of the present disclosure, in the portable terminal according to the first aspect of the present disclosure, the operator assistance module enables the setting operation or the status viewing of the electric appliance connected with the local area network, using a proxy function provided in the portable terminal, by displaying the setting page of the electric appliance, the setting page being viewable only through the local area network.

According to the third aspect of the present disclosure, in the portable terminal according to the first aspect of the present disclosure, the operator assistance module enables the setting operation or the status viewing of the electric appliance connected with the local area network, using a screen transfer function provided in the portable terminal.

According to a fourth aspect of the present disclosure, in the portable terminal according to the first aspect of the present disclosure, the electric appliance determination module acquires the model related information of the electric appliance from the communicatably connected operator server.

According to a fifth aspect of the present disclosure, an operator server determines, in response to a request from the electric appliance determination module in the portable terminal according to the fourth aspect of the present disclosure, the model related information of the electric appliance.

According to the fourth and fifth aspects of the present disclosure, an operator server determines the model related information of the electric appliance, so that this function needs not to be provide in a portable terminal but can be provided through SaaS (Software as a Service).

According to a sixth aspect of the present disclosure, an operator terminal communicatably connected with the portable terminal according to the first aspect of the present disclosure displays a network map on the portable terminal, the local area network, and the electric appliance based on the model related information of the electric appliance.

Accordingly, the network map of a local area network connected with a portable terminal can be displayed on an operator terminal.

According to a seventh aspect of the present disclosure, the operator terminal according to the sixth aspect of the present disclosure displays the device status of the electric appliance around the electric appliance displayed on the network map.

According to an eighth aspect of the present disclosure, the operator terminal according to the sixth aspect of the present disclosure sets, for the electric appliance displayed on the network map, the program or data corresponding to the electric appliance is set to a predetermined electric appliance by receiving input from an operator.

Accordingly, an operator operates the network map displayed on an operator terminal, so that a predetermined program and data can be set for an electric appliance in a local area network.

According to the ninth aspect of the present disclosure, an operator system includes:

a portable terminal receiving remote support from an operator terminal, the portable terminal communicatably connected with an electric appliance through a local area network and connected with the operator terminal through a public line network; and an operator server communicatably connected with the operator terminal, wherein the portable terminal includes:

an electric appliance detection module detecting an electric appliance connected with a local area network connected with the portable terminal, in response to an instruction from the operator terminal;

an electric appliance determination module determining the model related information of the detected electric appliance; and an operator assistance module enabling the setting operation or the status viewing of the electric appliance through the operator terminal based on the determined model related information, and the operator server includes a network map generation module receiving the model related information of the electric appliance from the portable terminal and generating a network map on the portable terminal, the local area network, and the electric appliance based on the model related information of the electric appliance.

Accordingly, when not the target device accessed by an operator terminal but other devices communicatably connected therewith have problems, an operator can configure the setting and view the status of the device with a problem, using the target device accessed by an operator terminal.

The ninth aspect of the present disclosure is the category of operator system, but the categories of remote support method and program for remote support have similar functions and effects.

According to the present disclosure, when not the target device accessed by an operator terminal but other devices communicatably connected therewith have problems, an operator can configure the setting and view the status of the device with a problem, using the target device accessed by an operator terminal.

DESCRIPTION OF EMBODIMENTS

Hereinafter, one mode of the present disclosure will be described with reference to the attached drawings. However, this is illustrative only, and the technological scope of the present disclosure is not limited thereto.

Configuration of Operator System

Figure 1:
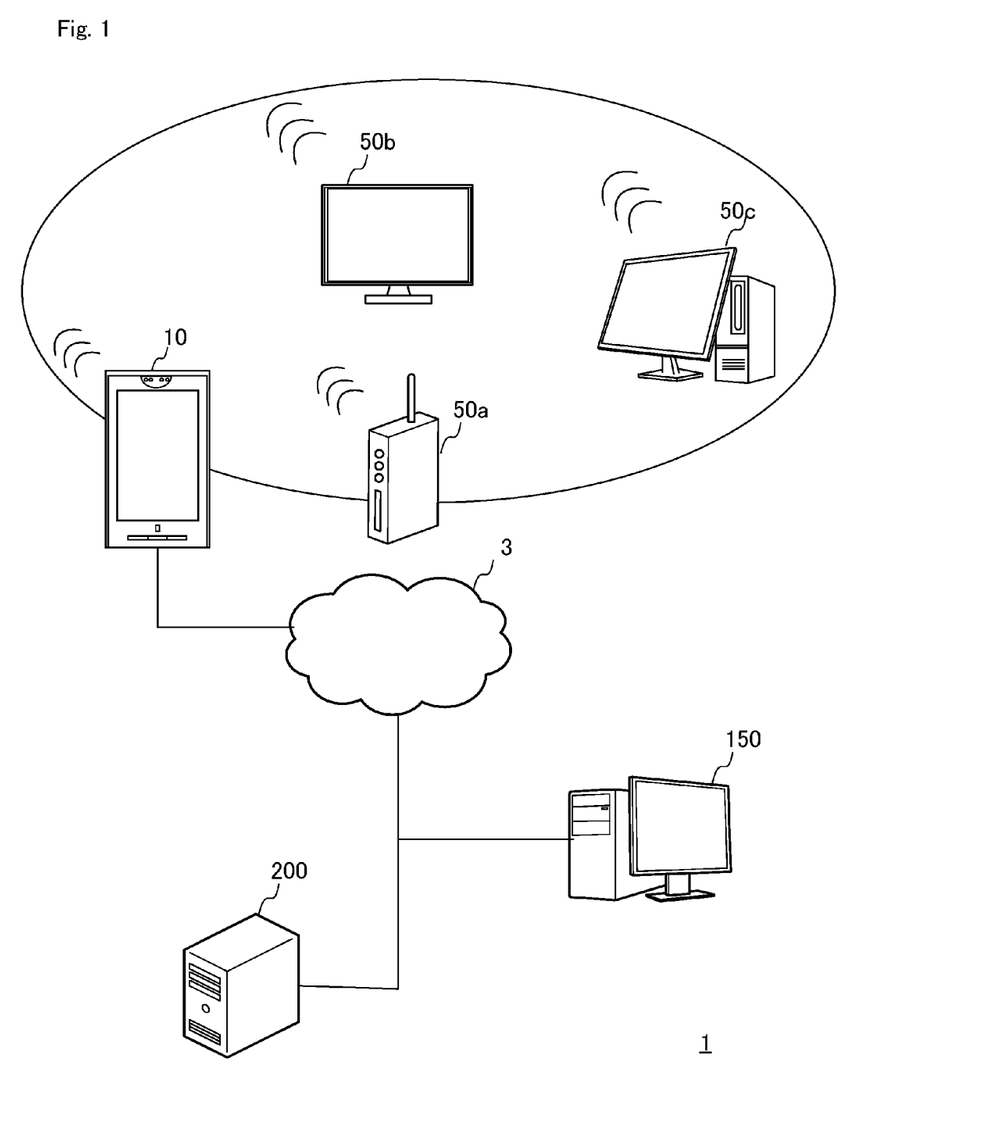
FIG. 1 shows an overall schematic diagram of the operator system 1.

FIG. 1 is a system configuration diagram of the operator system 1 that is a preferred embodiment of the present disclosure. The operator system 1 includes the portable terminal 10, the electric appliances 50a, 50b, and 50c (hereinafter simply referred to as "electric appliance terminal 50"), the operator server 200, the public line network 3 (e.g., an Internet network, a third generation communication network, a fourth generation communication network, etc.), and the operator terminal 150.

The portable terminal 10 is communicatably connected with the operator server 200 through the public line network 3. The portable terminal 10 and each electric appliance 50 are connected through a local area network (hereinafter referred to as "LAN"). The portable terminal 10 is connected with the operator server 200 or the operator terminal 150 through the public line network 3. The operator server 200 and the operator terminal 150 may be connected through a local area network or the public line network 3. The communication in the operator system 1 may be wireless communication or wired communication. The portable terminal 10 may be communicatably connected with the public line network 3 through a network device such as a router.

The portable terminal 10 may be a general information terminal used by a user for receiving support, which is an information device or an electrical appliance with the functions as described below. For example, the portable terminal 10 may be a mobile phone, a smart phone 10b, a complex printer, a television 10a, a network device such as a router or a gateway, and a computer 10c. The portable terminal 10 may also be white-colored home appliances such as a refrigerator and a washing machine. The portable terminal 10 may also be general information appliances such as a telephone, a netbook terminal, a slate terminal, an electronic book terminal, an electronic dictionary terminal, a portable music player, and a portable player capable of recording and playing back contents.

The electric appliance 50 is a domestic or business appliance capable of data communication. The electric appliance includes information appliances such as a personal computer 50c, a television 50b, a telephone, a computer, a mobile phone, a handheld terminal, a net book terminal, a slate terminal, an electronic book terminal, a portable music player, an audio component, a content player, a printer, a facsimile machine, a copy machine, a scanner machine, and an MFP (a multi-function peripheral device or a multi-function printer). The electric appliance also includes white-colored home electric appliances such as a refrigerator, a washing machine, a dishwasher, a fan, an air conditioner, an electric stove, a rice cooker, and a microwave oven. The electric appliance also includes a light, a server, a router 50a, a gateway, a network attached storage (hereinafter referred to as "NAS"), and the like.

The operator terminal 150 is an information terminal used by an operator who provides support for a portable terminal 10.

The operator server 200 is a server relaying data processing between the portable terminal 10 and the operator terminal 150 and executing various processes.

Functions

Figure 2:
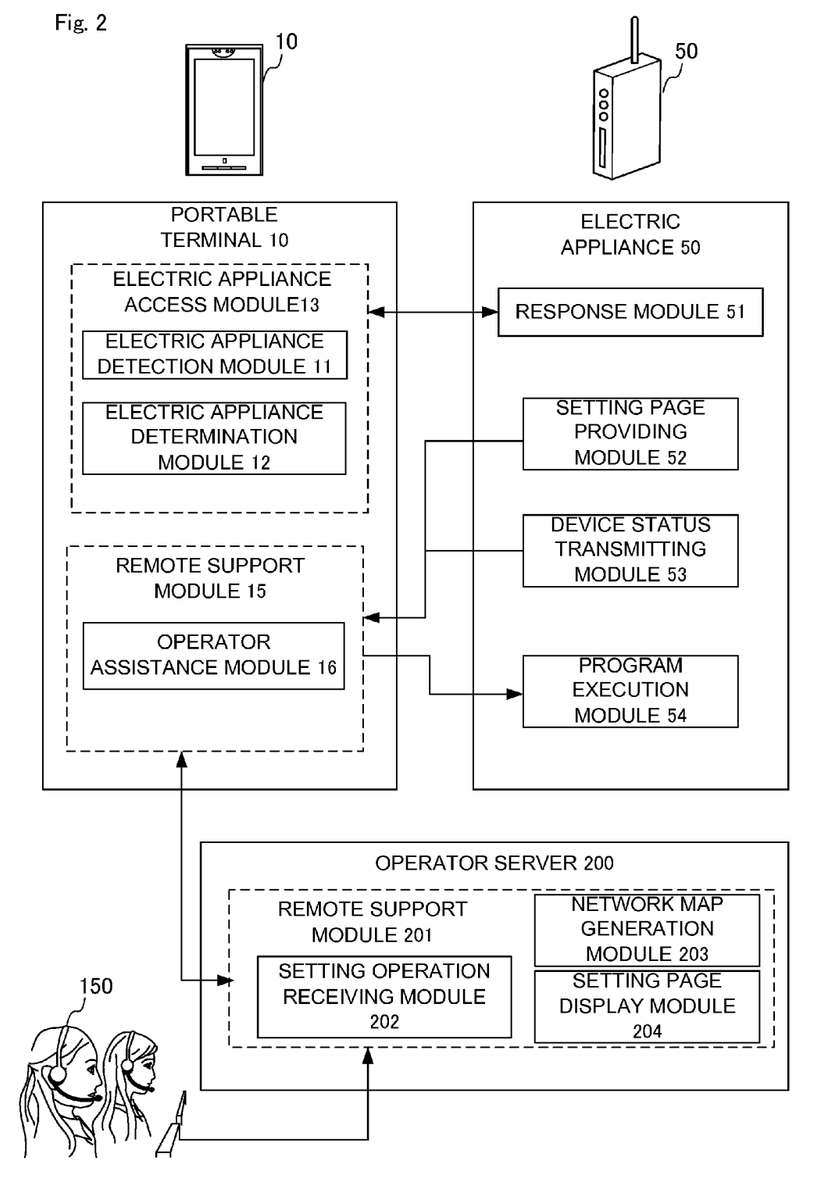
FIG. 2 shows a functional block diagram of the operator server 200, the portable terminal 10, and the operator terminal 150.

FIG. 2 illustrates the relationship among the respective functions of the operator terminal 150, the operator server 200, and the portable terminal 10.

The portable terminal 10 and the operator terminal 150 include a control unit including a central processing unit (hereinafter referred to as "CPU"), a random access memory (hereinafter referred to as "RAM"), and a read only memory (hereinafter referred to as "ROM"), and the like; and a communication unit including Wireless Fidelity® or WiFi® enabled device complying with, for example, IEEE802.11, a wireless device complying with the IMT-2000 standard such as the third generation mobile communication system, or the like. The communication unit may be achieved through fixed LAN connection.

The portable terminal 10 and the operator terminal 150 also include a display unit outputting and displaying data and images that are controlled by the control unit as an output unit; and a touch panel, a keyboard, a mouse, and the like that receive input from a user and a operator as an input unit. The portable terminal 10 and the operator terminal 150 also include a data storage unit as a memory unit such as a hard disk or a semiconductor memory.

In the portable terminal 10, the control unit reads a predetermined program and cooperates with the communication unit, the output unit, the input unit, and the memory unit to achieve the electric appliance access module 13 and the remote support module 15. The electric appliance access module 13 includes the electric appliance detection module 11 detecting the electric appliance 50 communicatably connected therewith and the electric appliance determination module 12 determining the detected electric appliance 50. The remote support module 15 is provided with the operator assistance module 16 to assist in operator's operation.

In a similar way, the electric terminal 50 includes a control unit including a CPU, a RAM, a ROM, and the like; and a communication unit including Wireless Fidelity® or WiFi® enabled device complying with, for example, IEEE802.11, a wireless device complying with the IMT-2000 standard such as the third generation mobile communication system, or the like. The communication unit may be achieved through fixed LAN connection. The electric appliance 50 may also include a data storage unit as a memory unit such as a hard disk or a semiconductor memory.

The electric appliance 50 may also include a display unit outputting and displaying data and images that are controlled by the control unit as an output unit, or may also include a touch panel, a keyboard, a mouse, and the like that receive input from a user and an operator as an input unit.

In the electric appliance 50, the control unit reads a predetermined program, cooperating with the communication unit, the output unit, the input unit, and the memory unit to achieve the response module 51 responding to a packet transmitted from the portable terminal 10, the setting page providing module 52 providing the setting page described below, the device status transmitting module 53 transmitting the device status of the electric appliance 50 to the portable terminal 10, and the program execution module 54 executing the predetermined program.

The operator server 200 includes a control unit including a CPU, a RAM, a ROM, and the like; and a communication unit including WiFi® enabled device complying with, for example, IEEE802.11. The operator server 200 also includes a data storage unit as a memory unit such as a hard disk or a semiconductor memory.

The control unit of the operator server 200 reads a predetermined program, cooperating with the communication unit and the memory unit to achieve the remote support module 201 allowing an operator to conduct remote support, using the operator terminal 150. The remote support module 201 includes the setting operation receiving module 202 receiving operation from the operator terminal 150, the network map generation module 203 generating the network map of the local area network to which the portable terminal 10 belongs, and the setting page display module 204 displaying the setting page described below.

Remote Support Process

Figure 3:
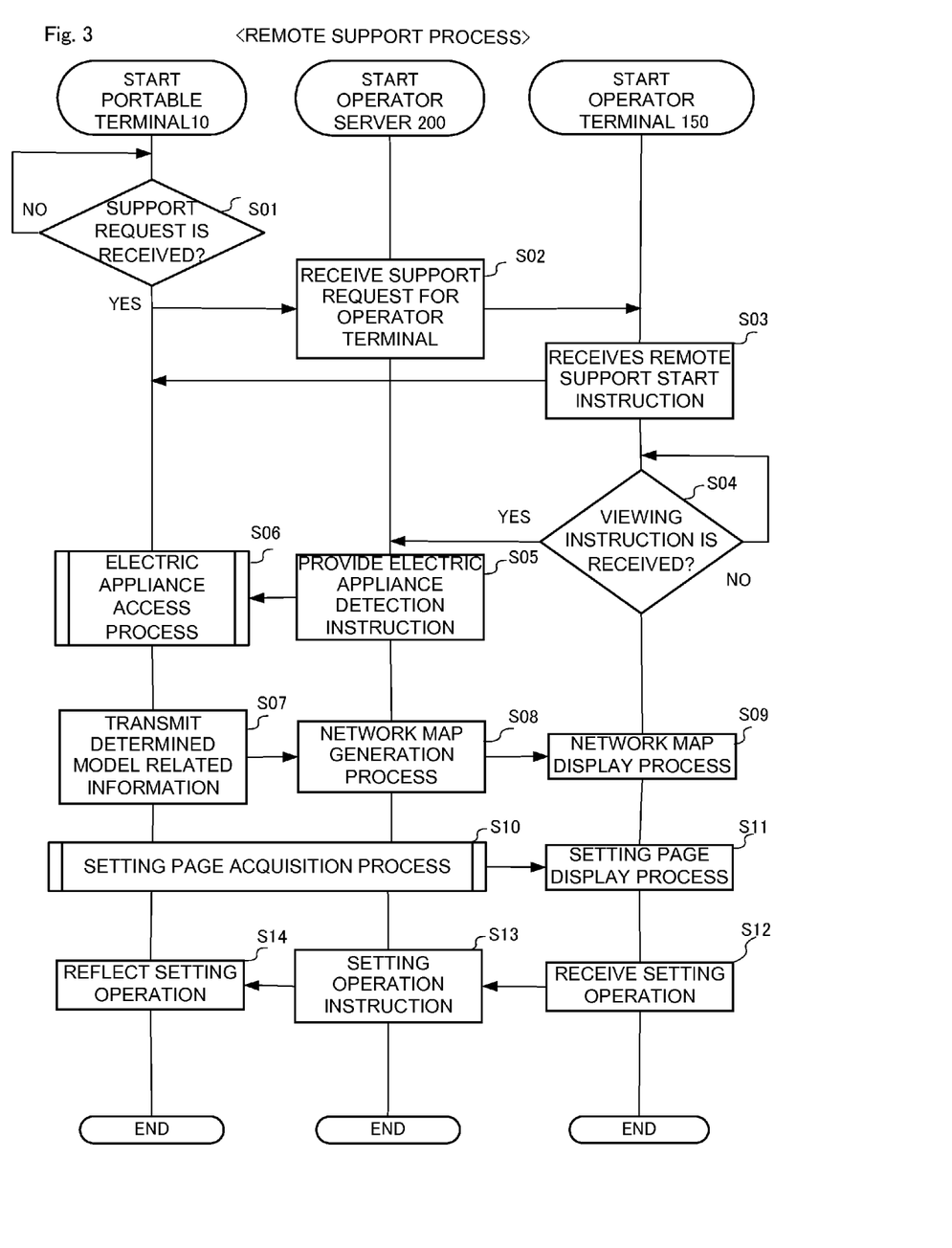
FIG. 3 is a flow chart diagram illustrating the remote support process executed by the operator server 200, the portable terminal 10, and the operator terminal 150.

FIG. 3 is a flow chart diagram of the remote support process executed by the portable terminal 10, the operator server 200, and the operator terminal 150. The process executed by the module of each of the above-mentioned devices will be explained together with the present process.

The portable terminal 10 receives operation requested by a user for support (Step S01). In the portable terminal 10, for example, an application to receive remote support is installed. Accordingly the portable terminal 10 receives the operation to start this application from the user, accesses a predetermined web page from a predetermined portable terminal 10, and transmits a message request support from the operator server 200.

If the portable terminal 10 receives operation requested by a user for support (Step S01: "Yes"), the portable terminal 10 connects with the operator server 200, notifies the operator server 100 of support request, and moves the process to the step S02. If the portable terminal 10 does not receives operation requested by a user for support (Step S01: "NO"), the step S01 is repeated.

The remote support module 201 of the operator server 200 then receives support request for the operator terminal 150 (Step S02). Specifically, the remote support module 201 notifies one or more operator terminals 150 of support request and receives a remote support start instruction from the operator terminal 150.

When the operator terminal 150 receives a remote support start instruction from an operator to the portable terminal 10 (Step S03), the operator server 200 connects with the operator terminal 150 and the portable terminal 10. Like remote operation from an operator to a general terminal through remote login, the screen information being displayed on the display unit of the portable terminal 10 may be seen on the operator terminal 150, or may be remotely operate the portable terminal 10 from the operator terminal 150.

Figure 5:
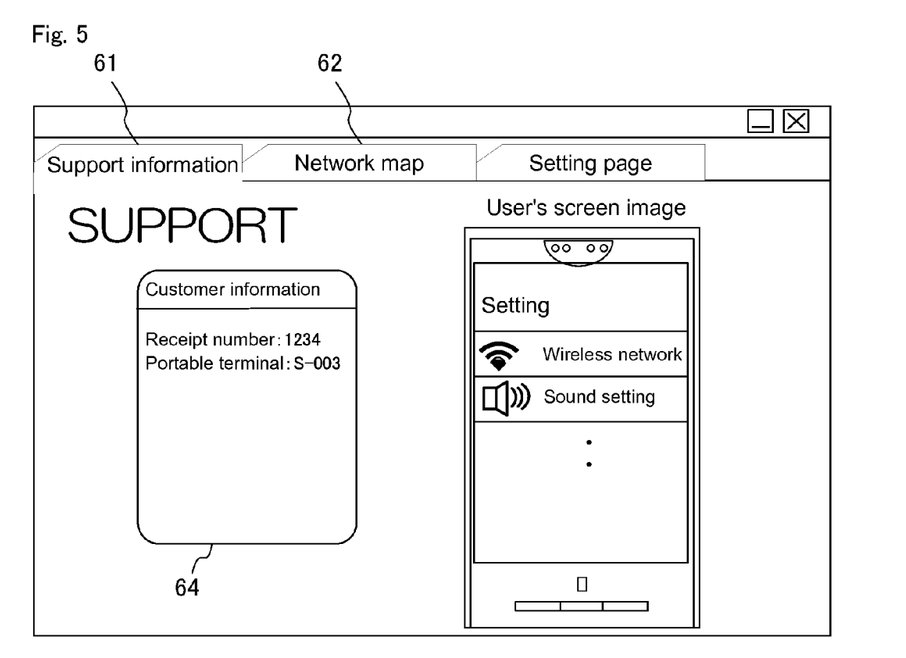
FIG. 5 illustrates a screen image (support information screen) displayed on the operator terminal 150.

At this point, the operator terminal 150 can execute the support process for the portable terminal 10. For example, the support information 61 as shown in FIG. 5 is displayed on the display unit of the operator terminal 150. Specifically, if the user of the portable terminal 10 preliminarily conducts user registration the customer information is output, and the screen information being displayed on the display unit of the portable terminal 10 is output and displayed. However, the electric appliance 50 communicatably connected with the portable terminal 10 may have a cause of failure. For example, when the portable terminal 10 cannot connects with the Internet, not the communication setting of the portable terminal 10 but the setting of the router 50a, an electric appliance 50 may have a problem. In this case, the process will be explained below.

The operator terminal 150 receives a viewing instruction for the electric appliance 50 (in this case, the router 50a) from an operator (Step S04). The viewing instruction is an instruction received from an operator to view the information of the electric appliance 50 communicatably connected with the portable terminal 10. One example of the viewing instruction is the viewing instruction of the network map including the electric appliance 50. For example, the operator provides the operator terminal 150 a viewing instruction to view the network map of the network connected with the portable terminal 10 on a window (tab) different from the support information 61 in FIG. 5. The viewing instruction of not only a network map but also the electric appliance 50 may be received.

If the operator terminal 150 receives a viewing instruction for the electric appliance 50 from an operator (Step 04: "YES"), the process proceeds to the step S05. If the result of the step S04 is "NO", the process is waiting in this step until a viewing instruction for the electric appliance 50 is received from an operator.

The remote support module 201 of the operator server 200 then provides an electric appliance detection instruction to the electric appliance access module 13 of the portable terminal 10 (Step S05). The electric appliance detection instruction is a process to instruct the electric appliance detection module 11 of the portable terminal 10 to detect the electric appliance 50 communicatably connected with the portable terminal 10 through a local area network.

The electric appliance access module 13 of the portable terminal 10 receives the electric appliance detection instruction from the operator server 200, and executes the electric appliance access process (Step S06). The electric appliance access process is a process executed by the portable terminal 10 and the electric appliance 50, which will be explained based on FIG. 4

Electric Appliance Access Process

Figure 4:
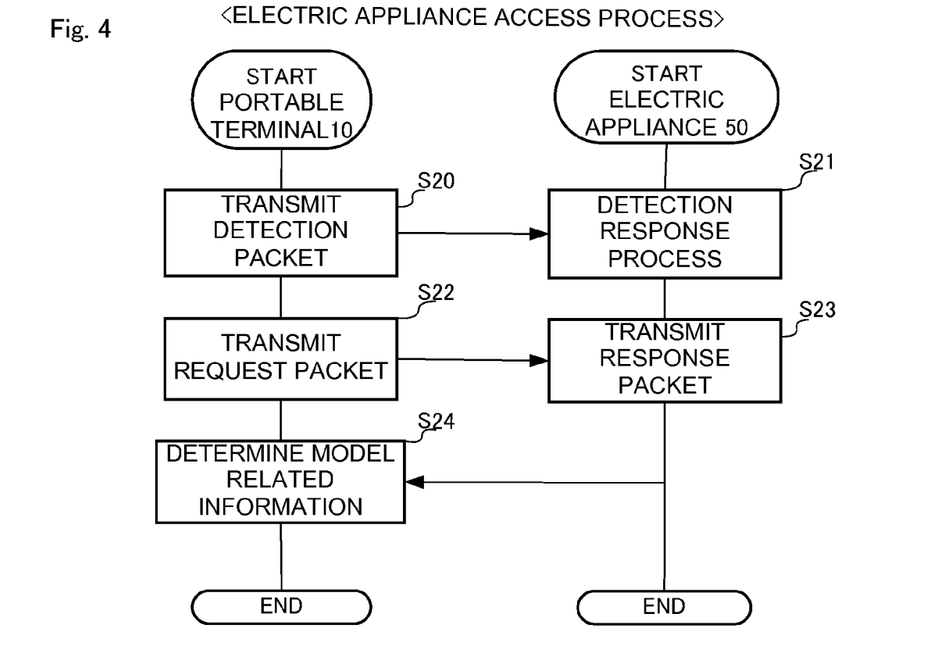
FIG. 4 shows a flow chart illustrating the electric appliance access process executed by the portable terminal 10 and the operator terminal 150.

The electric appliance access process is a process for the portable terminal 10 to determine the model related information of the electric appliance 50 by transmitting and receiving a predetermined packet. The model related information is information on the device types, such as the model name and the manufacturer name of the electric appliance 50. In the present process, the process to determine the types of electric appliances connected with a network by transmitting and receiving a packet may be used, as described in Japanese Unexamined Patent Application 2010-97587. The process to determine the model related information will be explained as disclosed herein.

The electric appliance detection module 11 of the portable terminal 10 transmits a detection packet to the electric appliance 50 (Step S20). The detection packet may be a packet transmitted from a command such as "ping." Each electric appliance 50 that has received a detection packet executes the detection response process by returning the IP address in response to the received packet (Step S21).

After the electric appliance 50 is detected, the electric appliance determination module 12 of the portable terminal 10 transmits a request packet to the detected electric appliance 50 (Step S22). The request packet is a packet for the portable terminal 10 to determine the model related information of the electric appliance 50.

For example, the request packet may be commands such as Address Resolution Protocol (hereinafter referred to as "ARP"), NETSTAT, Internet Control Message Protocol (hereinafter referred to as "ICMP"), and Simple Network Management Protocol (hereinafter referred to as "SNMP"), or may be protocols complying with Universal Plug and Play (hereinafter referred to as "uPnP") and Digital Living Network Alliance (hereinafter referred to as "DLNA").

The electric appliance 50 transmits a response packet to the received request packet (Step S23). For example, Media Access Control (hereinafter referred to as "MAC") address is acquired as a response in response to an ARP command. Moreover, the port numbers in use and the port occupancy of TCP/IP are identified by the command of NETSTAT.

Based on these response packets, the electric appliance determination module 12 of the portable terminal 10 determines the model related information of the electric appliance 50 that has received a request packet (Step S24). The model related information is determined by the scoring of the response packet.

As one example, determination whether the model related information of the electric appliance 50 is the model name A or the model name B will be explained. The scores corresponding to the respective responses packet to be received from the devices of the model names A and B are stored as a definition file of these model names, respectively. For example, in the case of the model name A, receiving the response packet (the TCP port 5000 is in use) for the request packet (NETSTAT) defines the score as "1" in the definition file, and other responses for a plurality of request packets (not only NETSTAT but also other response packets such as ARP) define the score as "0" in the definition file. A response packet received from the electric appliance 50 is scored based on the respective definition files of the model names A and B. The model name of the definition file with higher score is determined as the model related information.

For example, in the case of the model name A, receiving the response packet (the TCP port 5000 is in use) for the request packet (NETSTAT) defines the score as "1," and other responses define the score as "0." On the other hand, in the case of the model name B, receiving the response packet (the TCP port 5000 is not in use) for the request packet (NETSTAT) defines the score as "1," and other responses define the score as "0."

In this case, when the response packet (the TCP port 5000 is not in use) is received from the electric appliance 50, the score is "0" as calculated based on the definition file of the model name A, and the score is "1" as calculated based on the definition file of the model name B. Therefore, the model name B is the model related information. In this case, the model name B is determined based on only the request packet NETSTAT. However, other request packets (e.g., ARP) are also scored in the same way, and the model related information is determined based on the total score of NETSTAT and ARP.

The above-mentioned definition file may not be stored in the portable terminal 10 but the operator server 200. The portable terminal 10 transmits a response packet that has received from the electric appliance 50 to the operator server 200 to request the model related information from the operator server 200. In this case, the operator server 200 determines the model related information upon request. The electric appliance determination module 12 of the portable terminal 10 then acquires the model related information determined by the operator server 200, and executes the subsequent process. Alternatively, without the model related information determined by the operator server 200 being transmitted to the portable terminal 10, the operator server 200 may execute the network map generation process of the step S08.

The operator assistance module 16 of the portable terminal 10 transmits the determined model related information to the operator server 200 (Step S07). When the model related information is each determined for a plurality of electric appliances 50, the model related information of the individual electric appliance 50 is transmitted.

The network map generation module 203 of the operator server 200 generates a network map based on the model related information (Step S08). In the operator server 200, an icon (hereinafter referred to as "electric appliance icon") for the electric appliance displayed on a network map is associated with the model related information and stored, preliminarily. The corresponding electric appliance icon is extracted based on the received model related information to generate a network map. Furthermore, the local area network connected with the electric appliance 50 represents a circle or the like, and a cloud icon or the like is used for the public line network 3. The operator server 200 transmits the generated network map to the operator terminal 150.

Figure 6:
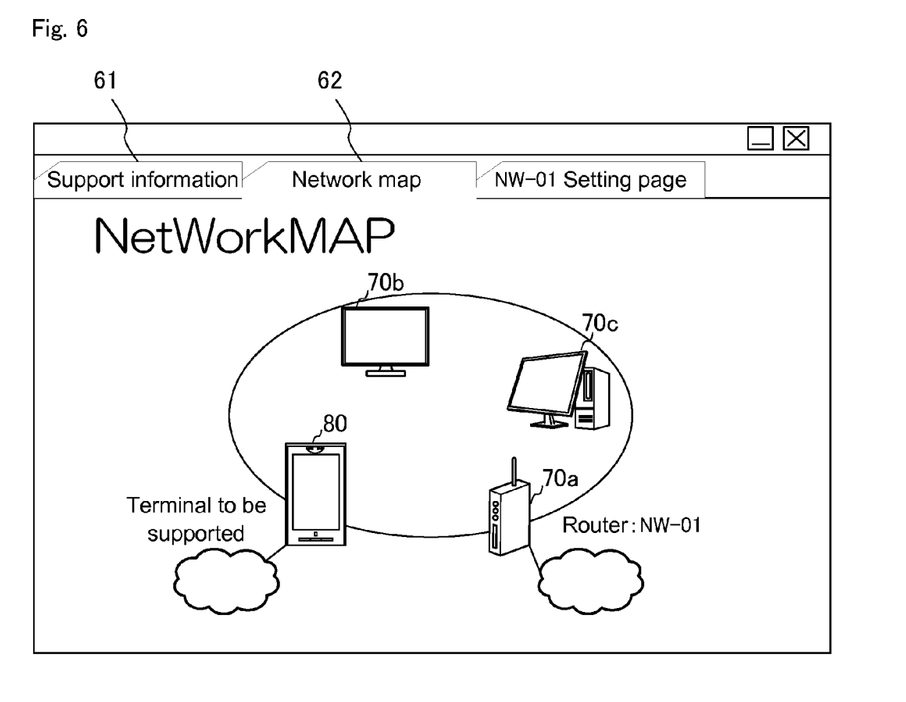
FIG. 6 illustrates a screen image (network map screen) displayed on the operator terminal 150.

The operator terminal 150 receives and displays the transmitted network map (Step S09). As one example, the network map is composed as shown in FIG. 6. The remote support window of the operator terminal 150 is provided with a plurality of window tabs of the support information 61 and the network map 62. The support information 61 and the network map 62 can be selected from an operator for display. The network map is displayed with the electric appliance icons 70a-b. For example, the model related information of the router 50a is determined as "NW-01," and the electric appliance icon 70a corresponding thereto is displayed. The portable terminal 10 may be represented by the icon 80.

Figure 7:
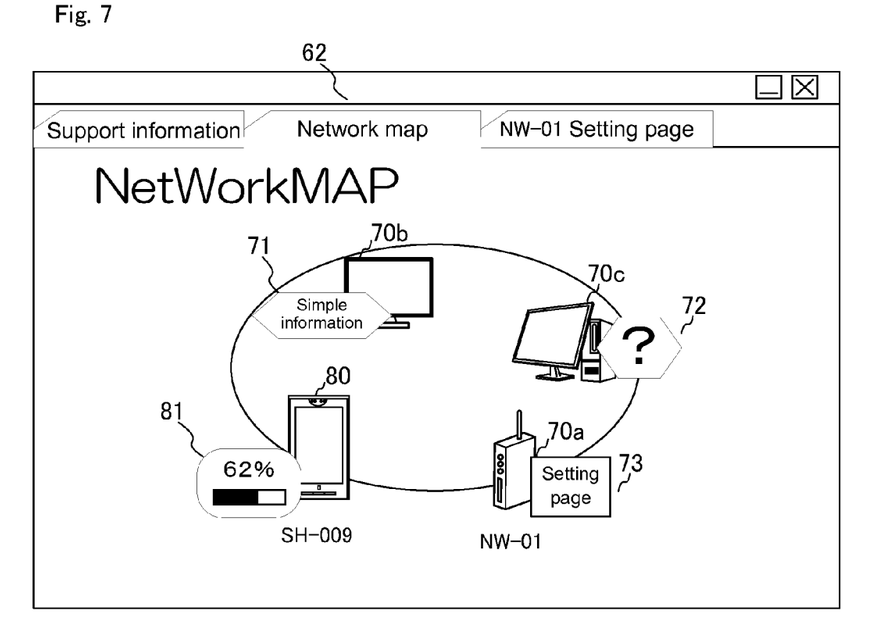
FIG. 7 illustrates a screen image (network map screen including device information icons) displayed on the operator terminal 150.

The device status of each of the electric appliances 50 and the portable terminal 10 may be displayed around the icon of the corresponding device on the network map as shown in FIG. 7. The device status is information on the device, for example, simple information indicating, for example, the failure situation, the executing state of the program or the like, the program installation status, and the presence or absence of the setting page described below of the electric appliance 50. In the setting page described below, the device status includes the setting status of the electric appliance 50.

For example, the portable terminal 10 may not able to determine the model related information even after detecting the electric appliance 50. In this case, the undetermined icon 72 is displayed near the electric appliance icon 70c to show that this electric appliance 50 has the failure in which the model related information was not able to be determined. Alternatively, information acquired from the electric appliance 50 by a transmitted request packet is displayed, as simple information. For example, the icon 71 indicating the presence of simple information or simple information itself is displayed on a network map.

The device status may be acquired by using the device status transmitting module 53 which is a program preliminarily installed in the electric appliance 50. The device status transmitting module 53 has a function to acquire and transmit the device status of the electric appliance 50 to the portable terminal 10 periodically On the other hand, when the setting page corresponding to the electric appliance 50 exists, the setting page icon 73 is displayed, as described below. Furthermore, when a predetermined program is executed or installed in the electric appliance 50, a graph illustrating the progress of the installation and the execution is displayed as the icon 81.

Setting Page Acquisition Process

Figure 9:
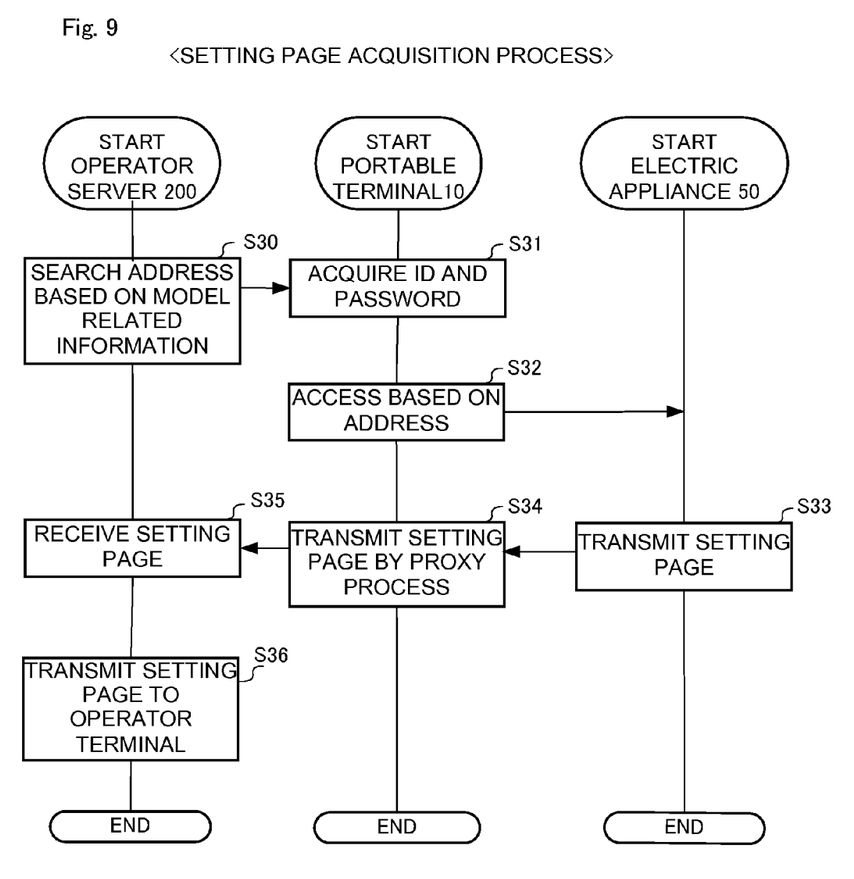
FIG. 9 is a flow chart diagram illustrating the setting page acquisition process executed by the operator server 200, the portable terminal 10, and the electric appliance 50.

The operator server 200, the portable terminal 10, and the electric appliance 50 then execute the setting page acquisition process (Step S10).

The setting page is a web page provided by the electric appliance 50, which enables the status viewing and the setting operation of the electric appliance 50. For example, the router 50a itself functions as a local web server, thereby enabling the setting page of the router 50a to be input and viewed from other devices.

Specifically, the router 50a detects the event that the URL address or the IP address provided from this router 50a as a private address is input to the web browser of the personal computer 50c communicatably connected with the router 50a through a local area network, and then displays the setting page on the web browser of the personal computer 50c. A user can view and input the setting page through the web browser. Generally, the setting page cannot be viewed and input from a device (with only a global address) connected through the public line network 3, as described below.

Figure 8:
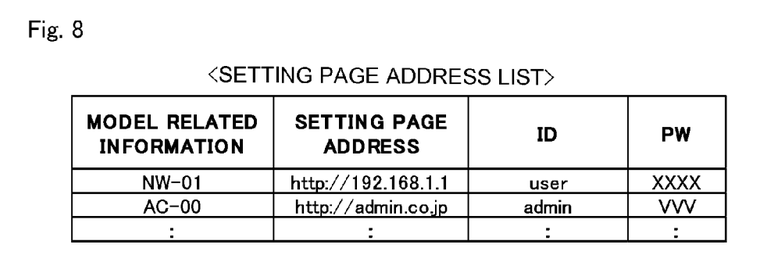
FIG. 8 is the setting page address list stored in the operator server 200.

The setting page display module 204 of the operator server 200 first searches a setting page address based on the model related information transmitted from the portable terminal 10, referring to the setting page address list shown in FIG. 8 (Step S30). The setting page address list is a list in which the model related information is associated with the URL address or the IP address of a setting page. For example, when the model related information is "NW-01", the setting page address is "http://192.168.1.1."

As shown in FIG. 8, the model related information may be associated with the URL address or the IP address of a setting page as well as the ID and the password to view and input the setting page. The ID and the password are set in the electric appliance 50 by default, and may be an ID and a password described in the manual or the like. The use of these described in the manual or the like enables a user to view and input the setting page even if the user does not know the default ID and password.

The setting operation receiving module 202 of the operator server 200 transmits a setting page address to the portable terminal 10. When stored in the setting page address list, the ID and the password are transmitted as well. In this case, the next step S31 is not executed.

When the ID or the password is not stored in the setting page address list, the setting page providing module 52 of the portable terminal 10 acquires the ID and the password stored in the portable terminal 10 (Step S31). In other words, a user stores the ID and the password of the setting page in the portable terminal 10.

The operator assistance module 16 of the portable terminal 10 accesses the electric appliance 50 based on the received setting page address (Step S32). In response to this, the setting page providing module 52 of the electric appliance 50 functions as a web server, and transmits the setting page to the portable terminal 10 (Step S33). Receiving the setting page, the portable terminal 10 inputs the acquired ID and password, responds to the electric appliance 50, and executes a process to log on the setting page.

The portable terminal 10 then transmits the setting page to the operator server 200 by the proxy process (Step S34). This proxy process will be explained by using FIG. 12. The electric appliance 50 is connected with the portable terminal 10 through a local area network, the electric appliance 50 has a private address (192.168.1.1), and the portable terminal 10 has a private address (192.168.1.50). The setting page data is transmitted as the data A of the source, which is the electric appliance 50, to the portable terminal 10, using the private addresses.

Figure 12:
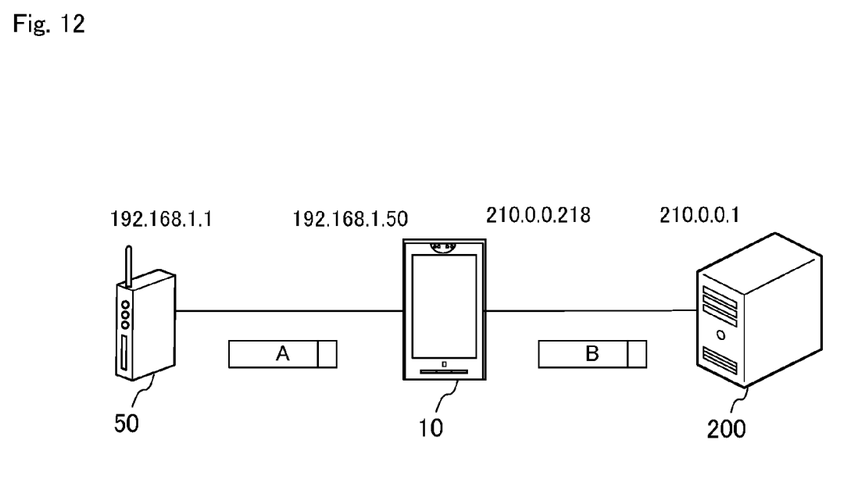
FIG. 12 is a conceptual diagram illustrating the proxy function achieved by the portable terminal 10.

On the other hand, the portable terminal 10 and the operator server 200 are connected through the public line network 3 with global addresses. The portable terminal 10 has a global address (210.0.0.218), and the operator server 200 has a global address (210.0.0.1). The portable terminal 10 changes the source into the portable terminal 10 and transmits the data A as the data B to the operator server 200, using the global addresses.

The operator server 200 receives a setting page by this proxy process (Step S35), and transmits the setting page to the operator terminal 150 (Step S36).

Figure 10:
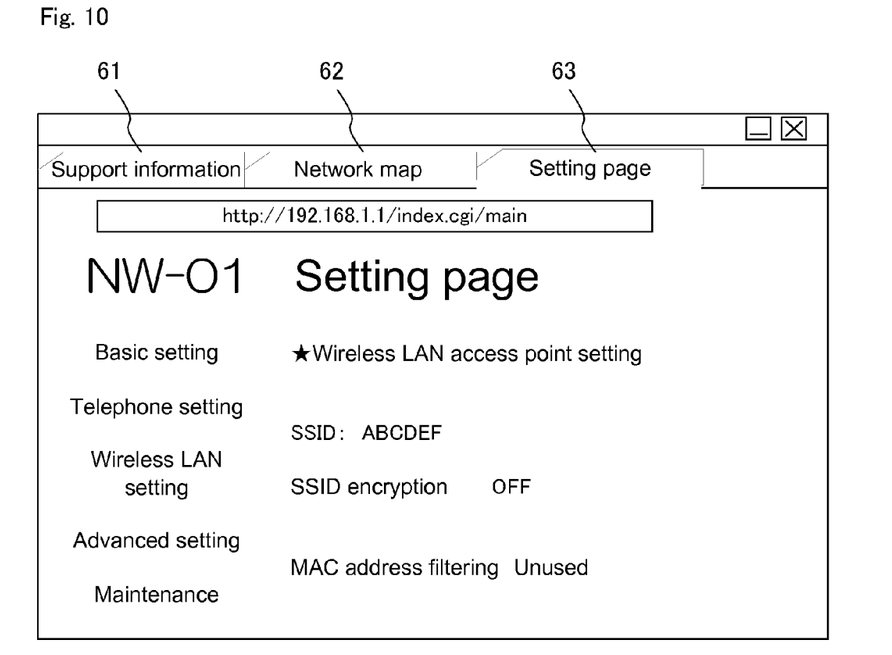
FIG. 10 illustrates a screen image (setting page) displayed on the operator terminal 150.

The process is returned to the remote support process of FIG. 3, and the operator terminal 150 displays the received setting page (Step S11). FIG. 10 shows the screen image of the setting page displayed on the operator terminal 150. The remote support window of the operator terminal 150 is provided with a plurality of window tabs of the support information 61 and the network map 62 as well as the setting page 63. The setting page can be selected from an operator for display.

The setting page shown in FIG. 10 is the network setting page of the router 50a of the model name "NW-01". This setting page enables the status viewing and the setting operation of the router 50a. For example, the status viewing and the setting operation of "Wireless LAN access point setting," "SSID setting," and the like of the router 50a are enabled.

Figure 11:
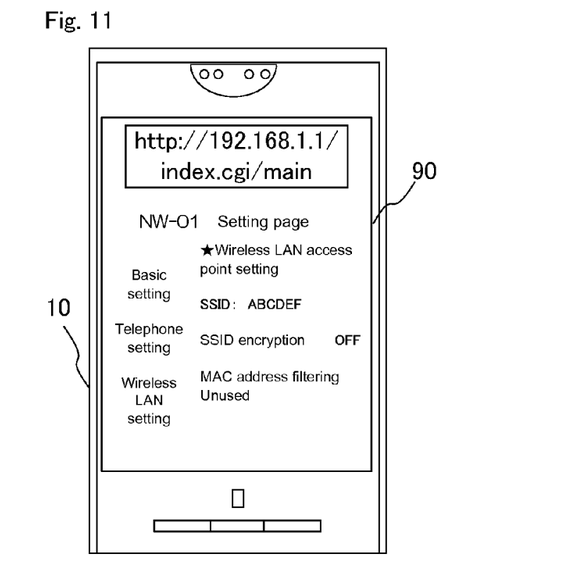
FIG. 11 illustrates a screen image (setting page) displayed on the portable terminal 10.

As described above, the viewing of the setting page is enabled by the proxy process executed by the portable terminal 10, but may be enabled by the screen transfer function achieved by the operator assistance module 16 of the portable terminal 10. Specifically, as shown in FIG. 11, when the setting page can be viewed and input in the portable terminal 10, this screen information is transferred to the operator server 200. Transmitting screen information as data to the operator server 200 may activate only transferring without the setting page being displayed on the portable terminal 10. The input information is transmitted from the operator terminal 150 to the electric appliance 50 through the portable terminal 10 to enable setting operation.

A program is installed in the electric appliance 50, and a command to set predetermined data is received from the operator server 200 and executed in the electric appliance 50 through the portable terminal 10. Specifically, when the operator terminal 150 receives the installation operation of a predetermined program and the data setting operation from an operator for the electric appliance icon of the network map displayed on the operator terminal 150, the operator server 200 transmits a predetermined command to the electric appliance 50.

In this case, the operator server 200 may receive a program to be installed from other servers, or may transmit a command to allow the electric appliance 50 to download a program. The command to set predetermined data may be preliminarily stored in the operator server 200. When the electric appliance 50 is, for example, a printer, the command to set predetermined data may be a switch between monochrome and color prints.

If the operator terminal 150 simultaneously receives the designation of a plurality of electric appliances 50 displayed on the network map from an operator, a predetermined program may be installed in a plurality of electric appliances 50.

The operator may be an information system administrator who administers a server and the like in a company or the like that is not limited to carriers and the manufacturer of the electric appliance 50. In this case, the command to set predetermined data may be a command to set the authorization control of users who use the electric appliance 50. Specifically, the operator server 100 receives the operation to set authorization for a network map from the operator terminal 150, and reads and transmits the corresponding command to the electric appliance 50 to set authorization.

To achieve the means and the functions as described above, a computer (including a CPU, an information processor, and various terminals) reads and executes a predetermined program. For example, a program is provided in the form recorded in computer-readable record media such as a flexible disk, a CD (CD-ROM, etc.), and a DVD (DVD-ROM, DVD-RAM, etc.). In this case, a computer reads a program from a record medium, forwards the program to internal or external storage to store the program therein, and executes the program. For example, the program may be preliminarily recorded in a memory device (record medium) such as a magnetic disk, an optical disk, and a magnetic optical disk, and then provided from the memory device to a computer through a communication line.

The embodiments of the present disclosure are described above, but the present invention is not limited to these abovementioned embodiments. The effects described in the embodiments of the present disclosure are merely listed as the most suitable effects produced from the present invention. The effects of the present invention are not limited to those described in the embodiments of the present disclosure. The electric appliance determination module 12 preferably determines the model related information by scoring based on a plurality of request packets as described above. The request packet may simply be a command of ICMP, SNMP, or the like. Accordingly, the model related information determination module 12 may determine the model related information only based on a response packet to such a request packet by transmitting uPnP.

REFERENCE SIGNS LIST

1 Operator system
3 Public line network
10 Portable terminal
200 Operator server
150 Operator terminal

The invention claimed is:

1. A portable terminal receiving remote support from an operator terminal, the portable terminal communicatably connected with an electric appliance through a local area network and connected with the operator terminal through a public line network, comprising:
 a processor; and
 memory operatively coupled to the processor, the memory storing instructions, which, when executed by the processor cause the processor to operate the following modules:
  an electric appliance detection module detecting an electric appliance connected with a local area network connected with the portable terminal, in response to an instruction from the operator terminal sent in response to receiving notification from the portable terminal that a user has requested support at the portable terminal;
  an electric appliance determination module determining model related information of the detected electric appliance; and
  an operator assistance module enabling the setting operation and a status viewing of the electric appliance through the operator terminal based on the determined model related information using a proxy function provided in the portable terminal, by displaying the setting page of the electric appliance, the setting page being viewable only through the local area network.

2. The portable terminal according to claim 1, wherein the electric appliance determination module acquires the model related information of the electric appliance from the communicatably connected operator server.

3. The portable terminal according to claim 1, wherein the electric appliance determination module acquired the model related information of the detected electric appliance by acquiring a model name and a manufacturer name of the detected electric appliance.

4. An operator system comprising:
 a portable terminal receiving remote support from an operator terminal, the portable terminal communicatably connected with an electric appliance through a local area network and connected with the operator terminal through a public line network; and
 an operator server communicatably connected with the operator terminal; wherein:
 the portable terminal includes:
  a processor; and
  memory operatively coupled to the processor, the memory storing instructions, which, when executed by the processor cause the processor to operate the following modules:
   an electric appliance detection module detecting an electric appliance connected with a local area network connected with the portable terminal, in response to an instruction from the operator terminal sent in response to receiving notification from the portable terminal that a user has requested support at the portable terminal;
   an electric appliance determination module determining model related information of the detected electric appliance; and
   an operator assistance module enabling the setting operation and a status viewing of the electric appliance through the operator terminal based on the determined model related information using a proxy function provided in the portable terminal, by displaying the setting page of the electric appliance, the setting page being viewable only through the local area network, and
 the operator server includes a network map generation module receiving the model related information of the electric appliance from the portable terminal and generating a network map on the portable terminal, the local area network, and the electric appliance based on the model related information of the electric appliance.

5. The operator system of claim 4 wherein the operator server is configured to determine, in response to a request from the electric appliance determination module in the portable terminal, the model related information of the electric appliance.

6. The operator system of claim 4 wherein the operator terminal is configured to display the map of the portable terminal, the local area network, and the electric appliance based on the model related information of the electric appliance.

7. The operator system according to claim 6 wherein the operator terminal is configured to display a device status of the electric appliance around the electric appliance displayed on the network map.

8. The operator system according to claim 6 wherein the operator terminal is configured to set, for the electric appliance displayed on the network map, the program or data corresponding to the electric appliance, to a predetermined electric appliance by receiving input from an operator.

9. A remote support method executed by a portable terminal receiving remote support from an operator terminal, the portable terminal communicatably connected with an electric appliance through a local area network and connected with the operator terminal through a public line network, comprising:
 an electric appliance detection step of detecting an electric appliance connected with the local area network connected with the portable terminal, in response to an instruction from the operator terminal sent in response to receiving notification from the portable terminal that a user has requested support at the portable terminal;
 an electric appliance determination step of determining model related information of the detected electric appliance; and an operator assistance step of enabling one of a setting operation and a status viewing of the electric appliance through the operator terminal based on the determined model related information using a screen transfer function provided in the portable terminal.

10. A computer program product for use in a portable terminal receiving remote support from an operator terminal, the portable terminal communicatably connected with an electric appliance through a local area network and connected with the operator terminal through a public line network, comprising a non-transitory computer usable medium having a set of instructions physically embodied therein; the set of instructions including:
    computer readable program code, which, when executed by the portable terminal, causes the portable terminal to detect an electric appliance connected with the local area network connected with the portable terminal, in response to an instruction from the operator terminal sent in response to receiving notification from the portable terminal that a user has requested support at the portable terminal;
    computer readable program code, which, when executed by the portable terminal, causes the portable terminal to determine the model related information of the detected electric appliance; and
    computer readable program code, which, when executed by the portable terminal, causes the portable terminal to enable the setting operation and a status viewing of the electric appliance through the operator terminal based on the determined model related information using a screen transfer function provided in the portable terminal.

11. A method performed by a computing device on a local area network (LAN), the method comprising:
    receiving a support request from a user;
    notifying a remote server across a wide area network (WAN) of the support request;
    in response, receiving an instruction to detect a set of electric appliances connected to the LAN;
    communicating with the set of electric appliances connected to the LAN to obtain model related information regarding each electric appliance of the set of electric model name and a manufacturer name of that given electric appliance;
    transmitting the obtained model related information regarding each electric appliance of the set of electric appliances to the remote server across the WAN, the remote server being configured to generate a network map of the LAN based on the model related information and send the network map to an operator terminal configured to display the network map to a support technician;
    receiving, via the WAN, instructions to obtain a settings page of a particular electric appliance of the set of electric appliances;
    obtaining the settings page from the particular electric appliance via the LAN; and
    sending the obtained settings page across the WAN to be displayed on the operator terminal to the support technician.

* * * * *

UNITED STATES PATENT AND TRADEMARK OFFICE
CERTIFICATE OF CORRECTION

PATENT NO.        : 8,977,740 B2
APPLICATION NO.   : 13/385846
DATED             : March 10, 2015
INVENTOR(S)       : Shunji Sugaya Page 1 of 1

It is certified that error appears in the above-identified patent and that said Letters Patent is hereby corrected as shown below:

In the Claims

Claim 1, Column 13, Line 45, "enabling the setting" should read --enabling one of a setting--.

Claim 2, Column 13, Line 55, "of the electric appliance from the" should read --of the detected electric appliance from a--.

Claim 3, Column 13, Line 58, "module acquired" should read --module acquires--.

Claim 4, Column 14, Line 20, "enabling the setting" should read --enabling one of a setting--.

Claim 10, Column 15, Line 23, "the model related" should read --model related--.

Claim 10, Column 15, Line 27, "enable the setting" should read --enable one of a setting--.

Claim 11, Column 16, Line 11, after 'electric,' insert --appliances, the model related information for a given electric appliance including a--.

Signed and Sealed this
Eighteenth Day of August, 2015

Michelle K. Lee
*Director of the United States Patent and Trademark Office*